United States Patent [19]

Shimotsuma et al.

[11] Patent Number: 5,436,851
[45] Date of Patent: Jul. 25, 1995

[54] SYSTEM FOR DATA COMMUNICATION

[75] Inventors: Hiroshi Shimotsuma; Yasunao Gou; Yoshikatsu Ikata; Toshiyuki Kimura, all of Kawagoe, Japan

[73] Assignee: Pioneer Electronic Corporation, Tokyo, Japan

[21] Appl. No.: 291,837

[22] Filed: Aug. 17, 1994

Related U.S. Application Data

[63] Continuation of Ser. No. 781,888, Oct. 24, 1991, abandoned.

[30] Foreign Application Priority Data

Oct. 25, 1990 [JP] Japan .................. 2-288225

[51] Int. Cl.6 .................................. G06F 17/00
[52] U.S. Cl. ................... 364/514 R; 345/10; 395/154; 395/156
[58] Field of Search ............... 345/10; 364/131, 132, 364/133, 424.03, 424.04, 514; 395/154, 156

[56] References Cited

U.S. PATENT DOCUMENTS

| 4,521,870 | 6/1985 | Babbel et al. ............ 364/900 X |
| 4,787,040 | 11/1988 | Ames et al. ............ 364/132 X |
| 4,829,385 | 5/1989 | Takezawa ............ 358/280 |

FOREIGN PATENT DOCUMENTS

| 0272877 | 6/1988 | European Pat. Off. . |
| 0282089 | 8/1990 | Germany .................. 364/132 |

OTHER PUBLICATIONS

IEEE Transactions on Consumer Electronics, vol. CE-31, No. 3, Aug. 1985, New York US pp. 516–525. M. Inoue et al. 'A Home automation system' p. 520, left column, line 20–line 30, FIG. 5; p. 523 left column, lines 1–31.

*Primary Examiner*—Edward R. Cosimano
*Attorney, Agent, or Firm*—Kane, Dalsimer, Sullivan, Kurucz, Levy, Eisele and Richard

[57] ABSTRACT

A communication network, such as an audiovisual system, on an automobile has a master unit and a plurality of slave units which are connected to a common communication bus. The display unit displays operation of the other slave units based on display data transmitted from the other slave units. The display data includes character data regarding a character to be displayed and/or standard bit data common with the slave units. The character data and/or the standard bit data may be positioned at the leading end of the display data.

4 Claims, 17 Drawing Sheets

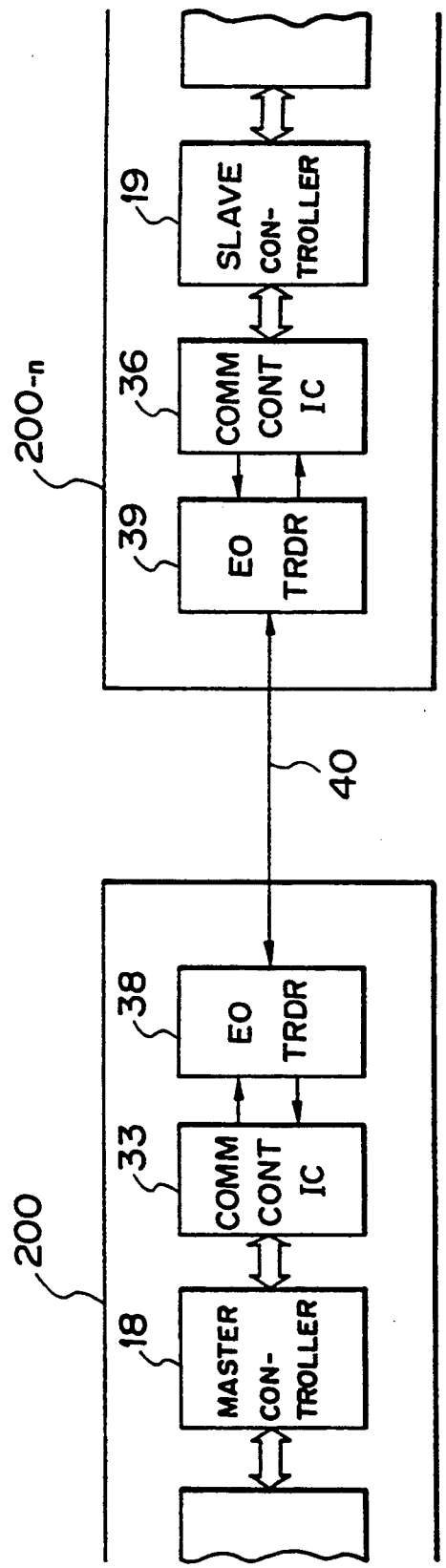

FIG. 7

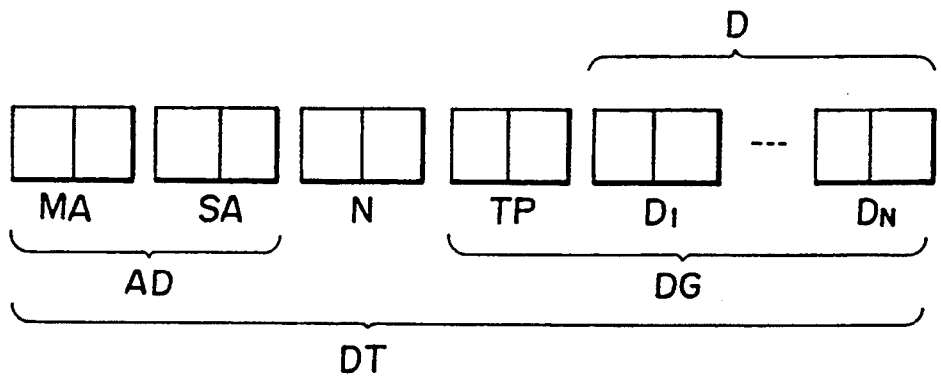

FIG. 8

| TP | CLASSIFI-CATION | FUNCTION·MEANING |
|---|---|---|
| 0H | CONNECTION CONFIRMATION DATA | TRANSFER OF DATA OF CONNECTION CONFIRMING OPERATION |
| 1H | STATUS INFORMATION | TRANSFER OF STATUS INFORMATION |
| 2H | KEY DATA | TRANSFER OF KEY DATA FROM KEY TO MASTER |
| 3H | KEY COMMAND | TRANSFER OF KEY COMMAND FROM MASTER TO SLAVE |
| 4H | SYSTEM COMMAND | TRANSFER OF COMMAND TO CONFIRM ACKNOWLEDGEMENT·OPERATION COMPLETION |
| 5H | SPECIAL COMMAND | TRANSFER OF OTHER THAN KEY COMMAND AND SYSTEM COMMAND |
| 6H | DISPLAY DATA | TRANSFER OF DISPLAY DATA |
| 7H | REFRESH | MASTER CONFIRMS STATUS OF SOURCE |
| 8H | MEMORY DATA | TRANSFER CONTENTS OF MEMORY |
| 9H | UNDEFINED | |
| AH | RETURN DATA | RETURN OF CHECK SUM RESULTS |
| BH | UNDEFINED | |
| CH | UNDEFINED | |
| DH | UNDEFINED | |
| EH | UNDEFINED | |
| FH | UNDEFINED | |

FIG.9

| MAJOR CLASS. | SUB-CLASS. | FORMAT | MEANING |
|---|---|---|---|
| 2H | 0H | DEDICATED KEY CODE | SENDING OF PRODUCT KEY CODE |
| | 1H | REMOTE CONTROL CODE | SENDING OF REMOTE CONTROL DATA |
| | 2H | KEY COMMAND | SENDING OF BUS COMMAND |
| | 3H | | |
| 0H | 0H | STANDARD FORMAT | |
| | 1H | EXTENDED FORMAT | TRANSFER OF GRAPHIC DATA |
| | | | |
| | | | |
| AH | 0H | — | CHECK SUM NG |
| | 1H | — | CHECK SUM OK |

FIG.11

| P ADDRESS | | FUNCTION | L ADDRESS | | P ADDRESS | | FUNCTION | L ADDRESS | |
|---|---|---|---|---|---|---|---|---|---|
| 0 | 0 | MASTER AND OTHER FUNCTIONS | ✳ | ✳ | 1 | 0 | | | |
| 0 | 1 | DISPLAY (0) | 0 | 1 | 1 | 1 | DISPLAY (1) | 1 | 1 |
| 0 | 2 | AUDIO (0) | 0 | 2 | 1 | 2 | AUDIO (1) | 1 | 2 |
| 0 | 3 | CASSETTE TAPE DECK | 0 | 3 | 1 | 3 | | 1 | 3 |
| 0 | 4 | SINGLE CD PLAYER | 0 | 4 | 1 | 4 | | 1 | 4 |
| 0 | 5 | TV TUNER | 0 | 5 | 1 | 5 | | 1 | 5 |
| 0 | 6 | MULTIPLE CD PLAYER (0) | 0 | 6 | 1 | 6 | MULTIPLE CD PLAYER (1) | 1 | 6 |
| 0 | 7 | FM/AM TUNER | 0 | 7 | 1 | 7 | | 1 | 7 |
| 0 | 8 | DAT | 0 | 8 | 1 | 8 | | 1 | 8 |
| 0 | 9 | EXTERNAL COMMANDER | 0 | 9 | 1 | 9 | | 1 | 9 |
| 0 | A | NAVIGATION SYSTEM | 0 | A | 1 | A | | 1 | A |
| 0 | B | | 0 | B | 1 | B | | 1 | B |
| 0 | C | RDS | 0 | C | 1 | C | | 1 | C |
| 0 | D | CD-ROM DECODER | 0 | D | 1 | D | | 1 | D |
| 0 | E | | 0 | E | 1 | E | | 1 | E |
| 0 | F | | 0 | F | 1 | F | | 1 | F |

FIG.12

| P ADDRESS | | FUNCTION | L ADDRESS | |
|---|---|---|---|---|
| 2 | 0 | | | |
| | | | | |
| 2 | 1 | CASSETTE TAPE DECK | 0 | 3 |
| | | AM/FM TUNER | 0 | 7 |
| 2 | 2 | SINGLE CD PLAYER | 0 | 4 |
| | | AM/FM TUNER | 0 | 7 |
| 2 | 3 | TV TUNER | 0 | 5 |
| | | FM/AM TUNER | 0 | 7 |
| 2 | 4 | DISPLAY | 0 | 1 |
| | | EXTERNAL COMMANDER (KEY) | 0 | 9 |
| 2 | 5 | | | |
| | | | | |
| 2 | 6 | | | |
| | | | | |
| 2 | 7 | | | |
| | | | | |
| 2 | 8 | | | |
| | | | | |

FIG.13

| L ADDRESS | | FUNCTION | L ADDRESS | | FUNCTION |
|---|---|---|---|---|---|
| 0 | 0 | MASTER (SOURCE SWITCHING·CONNECTION) | 1 | 0 | |
| 0 | 1 | DISPLAY (0) | 1 | 1 | |
| 0 | 2 | AUDIO (0) | 1 | 2 | AUDIO (1) |
| 0 | 3 | CASSETTE TAPE DECK | 1 | 3 | |
| 0 | 4 | SINGLE CD PLAYER | 1 | 4 | |
| 0 | 5 | TV TUNER | 1 | 5 | |
| 0 | 6 | MULTIPLE CD PLAYER (0) | 1 | 6 | MULTIPLE CD PLAYER (1) |
| 0 | 7 | FM/AM TUNER | 1 | 7 | |
| 0 | 8 | DAT | 1 | 8 | |
| 0 | 9 | EXTERNAL COMMANDER (WIRED REMOTE CONT) | 1 | 9 | |
| 0 | A | NAVIGATION SYSTEM | 1 | A | |
| 0 | B | | 1 | B | |
| 0 | C | RDS | 1 | C | |
| 0 | D | CD-ROM DECODER | 1 | D | |
| 0 | E | | 1 | E | |
| 0 | F | | 1 | F | |

| 5 | 0 | | 4 | 0 | | 4 | 1 | | 5 | 0 |
|---|---|---|---|---|---|---|---|---|---|---|

CHR 1  2  3  4
CHD

| 7 | DISC SCAN | ITP CLEAR | 3 |
|---|---|---|---|
| 6 | DISC PEPEAT | ITP IN | 2 |
| 5 | PRGRM PLAY | ITP FULL | 1 |
| 4 | ITP PLAY | ITP EMPTY | 0 |

BIT DATA 1

| 7 | COLD 2 | DISC 4 | 3 |
|---|---|---|---|
| 6 | COLD 1 | DISC 3 | 2 |
| 5 | DISC 6 | DISC 2 | 1 |
| 4 | DISC 5 | DISC 1 | 0 |

BIT DATA 2

SYSTEM FOR DATA COMMUNICATION

This application is a continuation of application No. 07/781,888, filed Oct. 24, 1991, now abandoned.

BACKGROUND OF THE INVENTION

1. Field of the Invention

The present invention relates to a system for data communication through a communication bus, and more particularly to a system for data communication in a network of components of an audiovisual system on an automobile.

2. Description of the Prior Art

In recent years, automobile audio systems have been changing from systems which give a user only audio information such as music to systems which allow the user to enjoy both audio and visual information. Systems with both audio and visual capabilities are known as audiovisual systems.

Automobile audiovisual systems on automobiles are composed of many different audio and visual components. The audio components include a cassette tape deck, a radio tuner, a CD (compact disk) player, etc., while the visual components include a TV (television) tuner, a navigation system, etc.. Audio signals produced by some of these components are amplified by an amplifier and reproduced from loudspeakers in the automobile. Video signals produced by other components are displayed on a display unit in the automobile. Today, the audiovisual system components are controlled according to digital technology, i.e., by respective controllers in the form of microcomputers.

The components of an audiovisual system are required to be controlled systematically for systematic operation of the components. To meet this requirement, the controllers of the respective components are connected by a communication bus network, so that control data for the components will be transmitted through the communication bus.

In the conventional audiovisual system network, the controllers of the components are controlled by a polling process. According to the polling process, either one of the controllers is given a priority status and handled as a master unit, with the other controllers as slave units, and when the master unit is to collect data from a slave unit, the master unit always accesses the slave unit, i.e., initiates the transfer of the data from the slave unit.

When the master unit transmits communication data to a slave unit for access or the slave unit transmits data back to the master unit, it is necessary that the controllers be identified or specified. For this purpose, the controllers are allotted respective addresses indicating themselves.

The audiovisual system includes a slave unit having a display function in the form of a display unit or the like for the centralized display of various data from slave units or sources such as the CD player, the tuner, the cassette tape deck, etc.

The data are transferred from each source to the display unit in formats that are determined depending on the sources for data compression. One example of such display data transfer format is shown in FIGS. 20, 21A and 21B of the accompanying drawings. That is, the display data includes disk number, playing minute, playing second, track number, playing step (playing order of disk), and two bit data shown in FIGS. 21A and 21B.

The display unit, or the slave unit with the display function, displays the data transferred from another slave unit in a predetermined format. When a new slave unit such as a DAT (Digital Audio Tape recorder) is additionally connected to the audiovisual system, since a format for data to be transmitted from the newly connected slave unit has not been registered in the display unit, the display unit cannot decode and hence display the data from the newly connected slave unit. Consequently, the conventional audiovisual system or network lacks an ability to expand itself, i.e., expansibility.

SUMMARY OF THE INVENTION

It is an object of the present invention to provide a system for data communication, which system can cope with a newly connected slave unit for increased expansibility.

According to the present invention, there is provided a system for data communication in a communication network, comprising a communication bus, a master unit connected to the communication bus, and a plurality of slave units connected to the communication bus, the slave units including a display unit, the display unit comprising means for displaying operation of the other slave units based on display data transmitted from the other slave units, the display data including character data regarding a character to be displayed. The character data may be positioned at a leading end of the display data.

According to the present invention, there is also provided a system for data communication in a communication network, comprising a communication bus, a master unit connected to the communication bus, and a plurality of slave units connected to the communication bus, one of the slave units being a display unit, the display unit comprising means for displaying operation of the other slave units based on display data transmitted from the other slave units, the display data including standard bit data which is common with the slave units. The standard bit data may be positioned at a leading end of the display data.

According to the present invention, there is further provided a system for data communication in a communication network, comprising a communication bus, a master unit connected to the communication bus, and a plurality of slave units connected to the communication bus, one of the slave units being a display unit, the display unit comprising means for displaying operation of the other slave units based on display data transmitted from the other slave units, the display data including character data regarding a character to be displayed and standard bit data which is common with the slave units. The character data and the standard bit data may be positioned at a leading end of the display data.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 a block diagram of another specific arrangement in which a master unit and a slave unit are connected to each other.

FIG. 1 is a diagram of a transfer format of communication data.

FIG. 8 is a diagram of major classification data.

FIG. 9 is a diagram of subclassification data.

FIG. 11 is a diagram showing physical addresses.

FIG. 12 is a diagram showing physical addresses.

FIG. 13 is a diagram showing logical addresses.

DETAILED DESCRIPTION OF THE PREFERRED EMBODIMENTS

FIGS. 1A through 1H show the principles of the present invention.

Figure 1A:
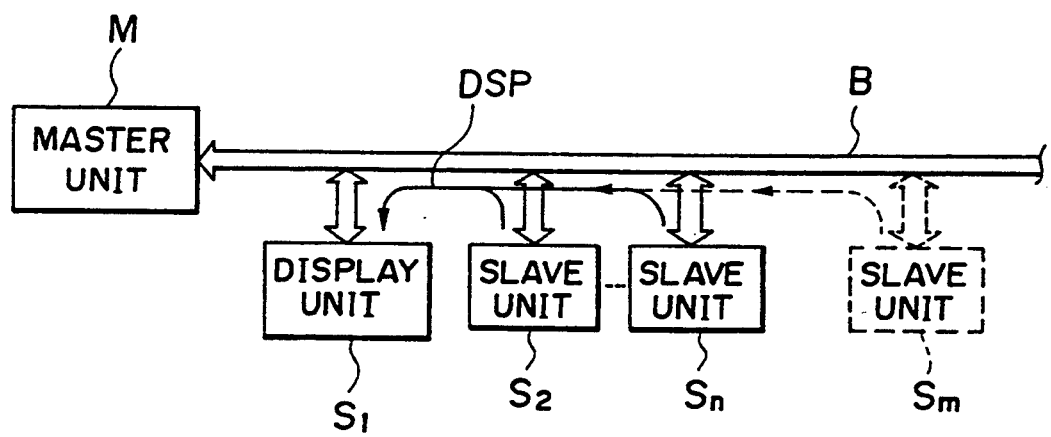
FIGS. 1A through 1H are diagrams illustrative of the principles of the present invention, respectively.

FIG. 1A shows a data communication system in which a master unit M and a plurality of slave units $S_1 \sim S_m$ including a display unit $S_1$ are connected to a common communication bus B. The display unit $S_1$ displays display data $DSP_1 \sim DSP_m$, collectively referred to as DSP, transmitted from the other slave units $S_2 \sim S_m$.

Figure 1B:
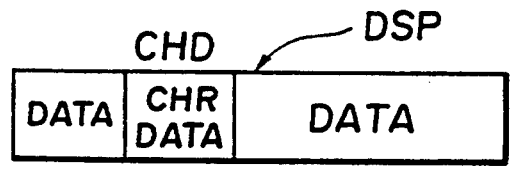

As shown in FIG. 1B, the display data DSP may include character data CHD regarding characters to be displayed. When the display data DSP includes the character data CHD, since even a newly added slave unit can give data to be displayed to the display unit $S_1$, the data can be displayed by the display unit $S_1$. The system therefore has high expansibility.

Figure 1C:
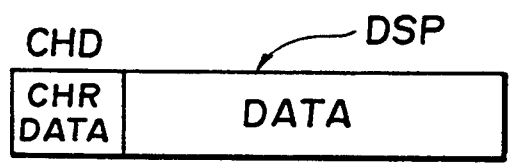

As shown in FIG. 1C, the display data DSP may include character data CHD positioned at the leading end of display data DSP. With the character data CHD positioned at the leading end of the display data DSP, the display data DSP is systematized, so that there is no need to search the position of the character data CHD in each of the display data transmitted from the slave units $S_2$ to $S_M$. Thus, even a newly added slave unit can give data to be displayed to the display unit $S_1$, and the data can be displayed easily by the display unit $S_1$. The system therefore has high expansibility.

Figure 1D:
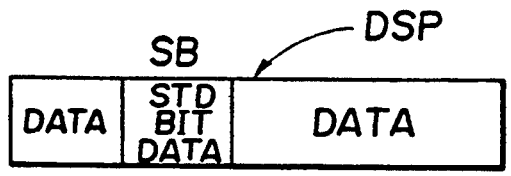

As shown in FIG. 1D, the display data DSP may include standard (common) bit data SB which is common with the slave units $S_1 \sim S_m$. When the display data DSP includes the standard bit data SB common with the slave units, display data including the standard bit data SB from a newly added slave unit can be displayed.

Figure 1E:
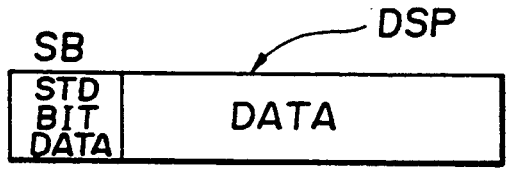
Figure 1F:
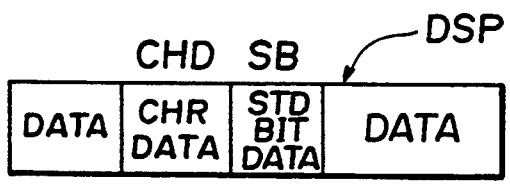

As shown in FIG. 1E, the display data DSP may include standard bit data SB positioned at the leading end of the display data DSP. With the standard bit data SB positioned at the leading end of the display data DSP, the display data DSP is systematized, and display data including the standard bit data SB from a newly added slave unit can be displayed.

As shown in FIG. IF, the display data DSP may include character data CHD regarding characters to be displayed, and standard bit data SB which is common with the slave units $S_1 \sim S_m$. With both the standard bit data SB and the character data CHD included in the display data DSP, display data can reliably be displayed.

Figure 1G:
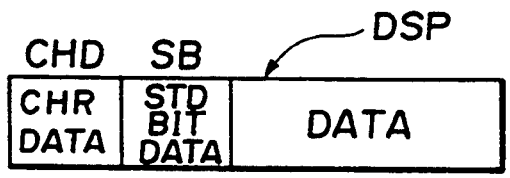
Figure 1H:
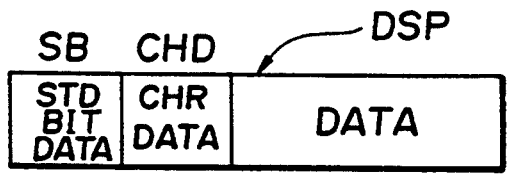

As shown in FIGS. 1G and 1H, the display data DSP may include character data CHD and standard bit data SB which are positioned at the leading end of display data DSP. Specifically, the character data CHD may precede the standard bit data SB as shown in FIG. 1G, or the standard bit data SB may precede the character data CHD as shown in FIG. 1H. With both the standard bit data SB and the character data CHD included in the display data DSP, display data can reliably be displayed.

POWER SUPPLY OF AUDIOVISUAL SYSTEM

Figure 2:
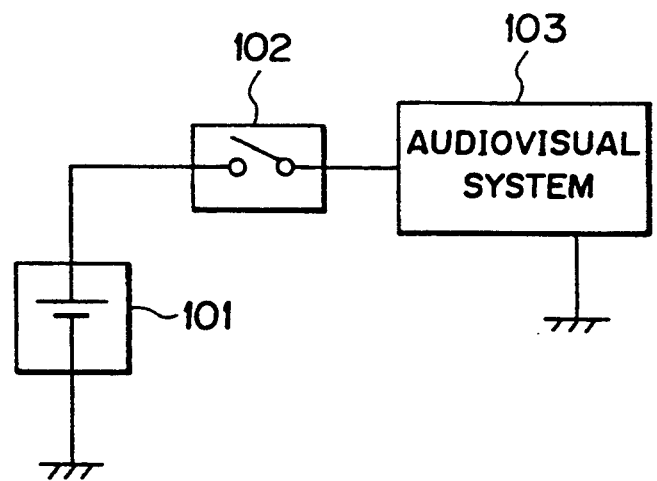
FIG. 2 is a block diagram of a power supply circuit for an audiovisual system.

The principles of the present invention are particularly useful when embodied in an audiovisual (AV) system on an automobile. As shown in FIG. 2, the audiovisual system, denoted at 103, is supplied with electric energy from a battery 101 through an ACC switch 102. The ACC switch 102 is assembled together with an engine start keyswitch of the automobile. When the engine key inserted in the engine start keyswitch is turned to the position of the ACC switch, the accessories on the automobile are energized by the battery 101. Therefore, the audiovisual system 103 is turned on or off each time the engine key is turned in the engine start keyswitch.

ARRANGEMENT OF AUDIOVISUAL SYSTEM

Figure 3:
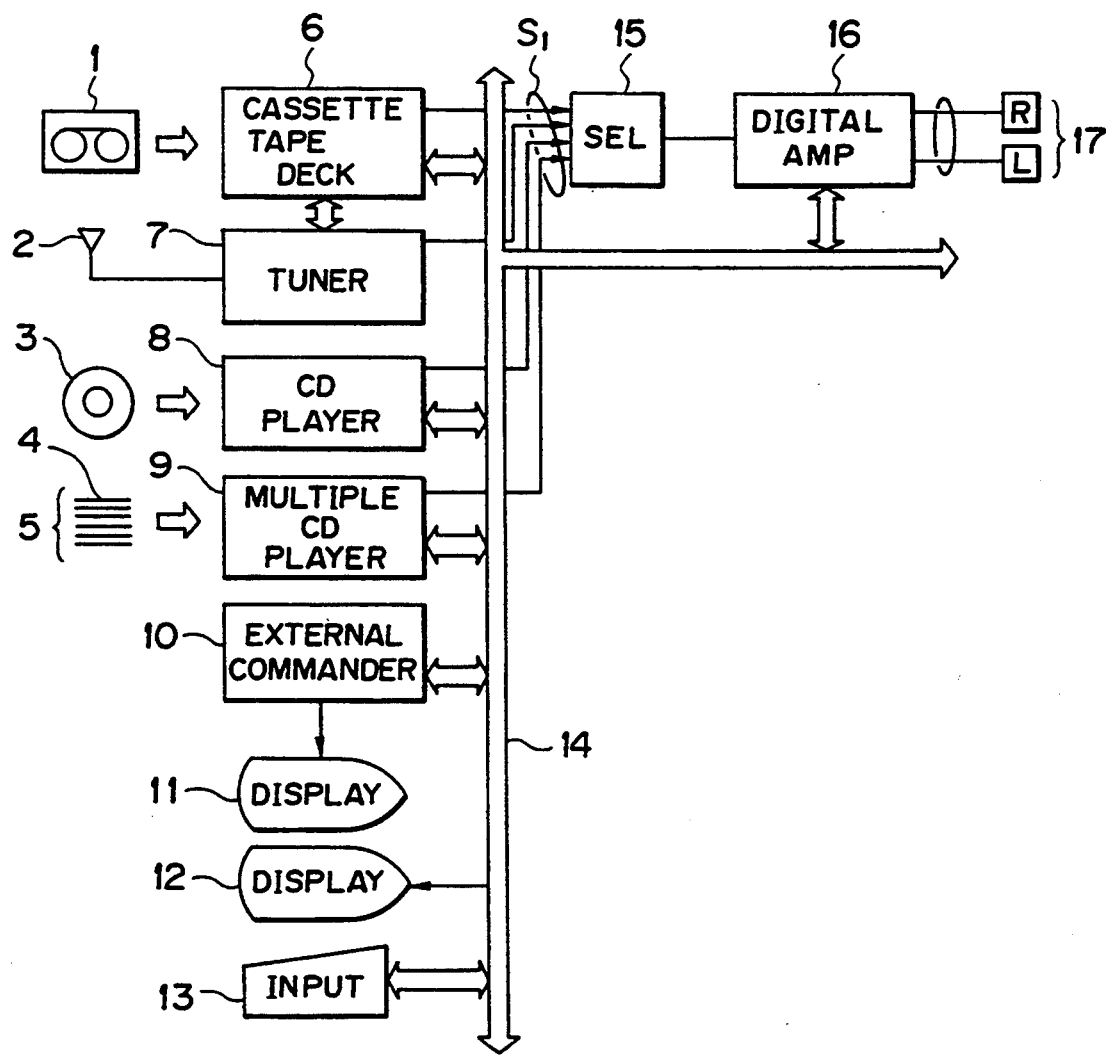
FIG. 3 is a block diagram of an audiovisual system.

FIG. 3 shows a detailed systematic arrangement of the audiovisual system. The audiovisual system has audio reproducing components and visual reproducing components. The audio reproducing components include a cassette tape deck 6 for reproducing recorded audio signals from a cassette tape 1, a tuner 7 such as an AM/FM tuner for reproducing radio signals which are received by an antenna 2, a CD player 8 for reproducing recorded signals from a CD 3, and a multiple CD player 9 having an automatic CD changer 5 for reproducing recorded signals from multiple CDs 4. The visual reproducing components include a TV tuner contained in the tuner 7, for reproducing TV signals received by the antenna 2, and a display unit 12 for displaying image based on the TV signals and also displaying still images based on signals from the CD player 8 if a CD-ROM is played back by the CD player 8. Typically, a CD-ROM is employed by a navigation system. The audiovisual system has an external commander 10 which is in the form of a keyboard for entering various operation commands. A display unit 11 is connected to the external commander 10. The audiovisual system also has an input unit 13, which may be incorporated in the external commander 10.

The above components of the audiovisual system have respective controllers for controlling their own operation. These controllers are connected to each other through a communication bus 14, thereby making up a communication bus control network. The control network is shown in FIG. 4, and will be described in detail later on.

Reproduced signals from the audio reproducing components are selectively applied through a selector 15 to a digital amplifier 16 or 16A. After the reproduced signal has been amplified by the digital amplifier 16, it is applied to loudspeakers 17 from which reproduced sounds are radiated. The digital amplifier 16 contains a digital signal processing circuit which is controlled by a controller in the digital amplifier 16, the controller being connected to the communication bus 14.

CONTROL NETWORK OF AUDIOVISUAL SYSTEM

Figure 4:
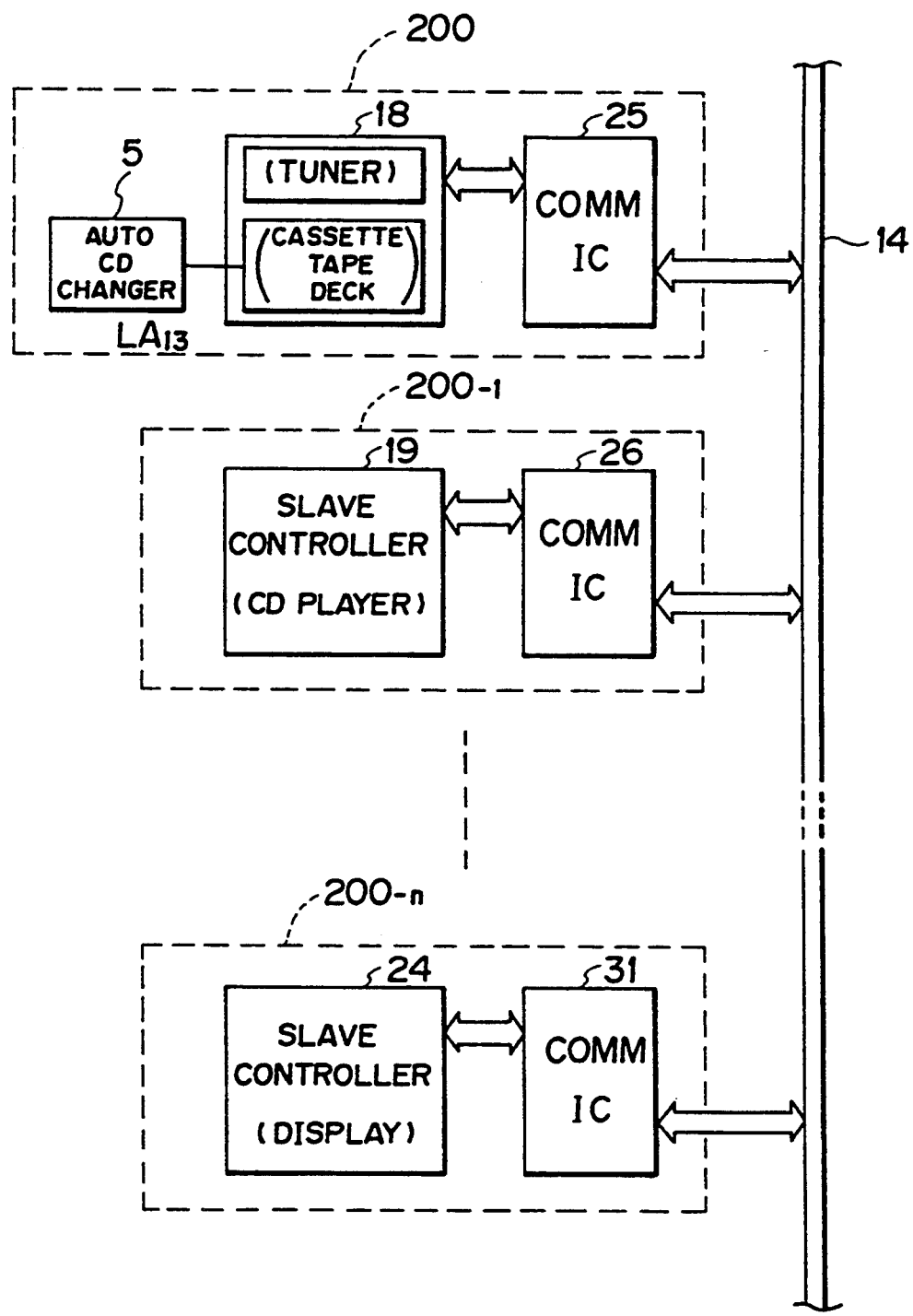
FIG. 4 is a block diagram of a control network of the audiovisual system.

FIG. 4 shows the control network in detail. For the purpose of description, the audiovisual system components connected to the communication bus 14 as shown in FIG. 3 will hereinafter be referred to as "units". As shown in FIG. 4, these units are connected to the communication bus 14 parallel to each other. Either one of these units is selected as a "master" unit, indicated by 200, for controlling the control network, while the other units serve as "slave" units, indicated by $200_{-1} \sim 200_{-n}$.

The master unit 200 has a master controller 18 connected through a communication interface IC 25 to a communication bus 14. The master controller 18 includes controllers for controlling the cassette tape deck 6 and the tuner 7. The controller for the cassette tape back 6 also controls the automatic CD changer 5. The slave units $200_{-1} \sim 200_{-n}$ have respective slave controllers 19~24 which are also connected to the communication bus 14 through respective communication interface ICs 26~31.

Figure 5:
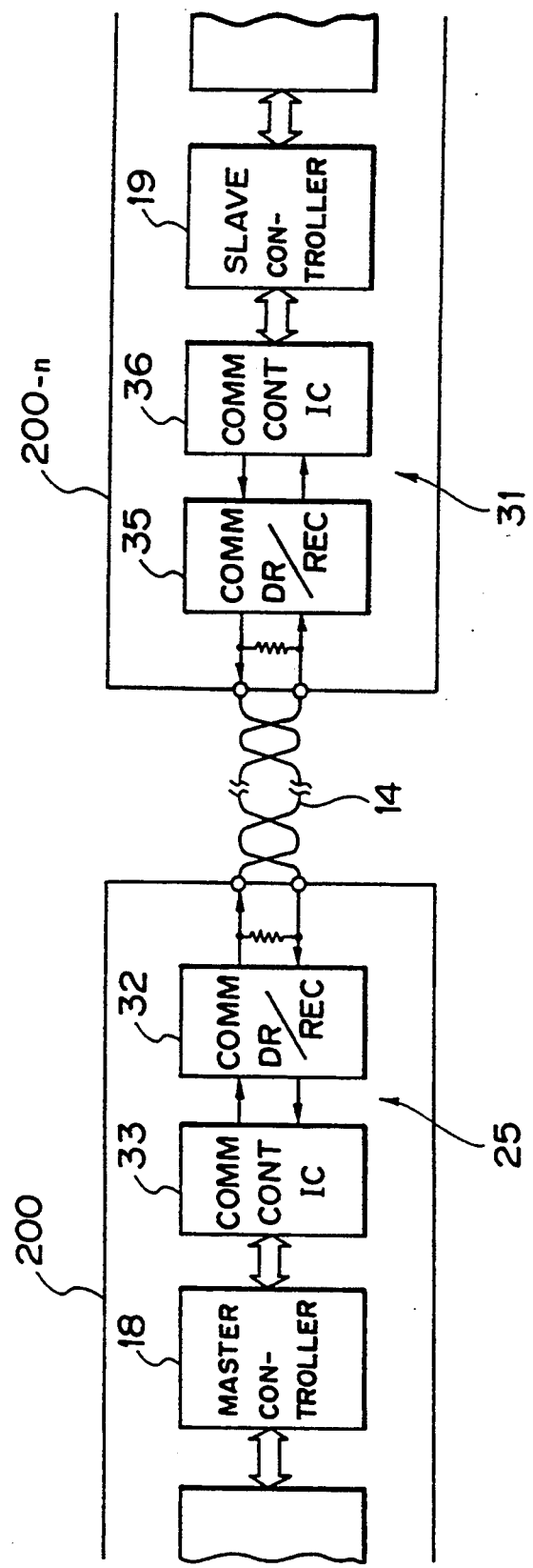
FIG. 5 a block diagram of a specific arrangement in which a master unit and a slave unit are connected to each other.

FIG. 5 shows a specific arrangement in which the master unit 200 and the slave unit $200_{-n}$ are connected to each other. The master unit 200 and the slave unit $200_{-n}$ are connected to each other by the communication bus 14. The communication bus 14 comprises a twisted pair of conductors. Communication data DT transferred through the communication bus 14 is transmitted and received by the communication interface ICs 25, 31 of the master unit 200 and the slave unit $200_{-n}$, respectively. The communication interface IC 25 is divided into a communication driver/receiver 32 and a communication control IC 33. Likewise, the communication interface IC 31 is divided into a communication driver/receiver 35 and a communication control IC 36. Heretofore, the communication driver/receiver and the communication control IC have been integrally combined in one IC. The communication control IC 33 is composed of a CMOS transistor, while the communication driver/receiver 32 is composed of a bipolar transistor of high current-driven capability. The communication driver/receiver 35 and the communication control IC 36 are of the same structures as the communication driver/receiver 32 and the communication control IC 33.

The communication interface IC 25, for example, which is divided into the communication control IC 33 and the communication driver/receiver 32, is capable of coping with different transmission mediums for the communication bus 14. In FIG. 5, the communication bus 14 is composed of a twisted pair of conductors for differential transmission. If the communication bus 14 comprises an optical communication cable 40 as shown in FIG. 6, then the communication driver/receivers 32 and 35 shown in FIG. 5 may be replaced with electro-optical transducers 38 and 39 with the communication control IC 33 remaining unchanged. Another advantage is that since the master unit 200 fails due primarily to disturbance noise entering from the communication bus 14, only the communication driver/receiver 32 will malfunction when an excessive signal is applied thereto from the communication bus 14, and replacing the malfunctioning communication driver/receiver 32 with a new one will restore the master unit 200. Consequently, the maintenance of the master unit 200 and also the slave unit $200_{-n}$ is relatively easy to carry out. The easy maintenance is particularly advantageous with audiovisual systems on automobiles because the master and slave units are exposed to noise induced by the automobile engines.

Furthermore, the fabrication of bipolar transistors and CMOS transistors according to different processes is easier and less expensive than the fabrication of Bi-CMOS ICs.

While only the communication interface IC 25 has been described above, each of the communication interfaces 26~31 of the other slave units $200_{-1} \sim 200_{-n}$ is also divided into a communication control IC and a communication driver/receiver.

TRANSFER FORMAT OF COMMUNICATION DATA DT

FIG. 7 shows a transfer format of the communication data DT. As shown in FIG. 7, the communication data DT comprises, from its leading end, master address data MA indicating the address of the master unit 200, slave address data SA indicating the addresses of the slave units $200_{-1} \sim 200_{-n}$, message length data N indicating the message length of data D, classification data TP indicating the type of the data D comprising $D_1$ through $D_n$, and the data D itself which represents the contents to be transferred. The classification data TP and the data D form a data group DG to be transmitted, and the master address data MA and the slave address data form address data AD.

Figure 10:
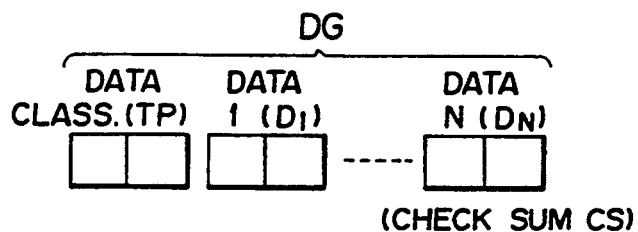
FIG. 10 is a diagram of basic data format.

The arrangement of the data D varies depending on the contents of the communication data DT, i.e., the classification data TP. There are roughly three formats for the data D. As shown in FIG. 10, a first format is a format for confirming a connection, a second format is a format for keys and display data, and a third format is a format for transmitting the result of a check sum CS. The format for confirming a connection, which is used when the communication data DT is transferred from the slave units $200_{-1} \sim 200_{-n}$ to the master unit 200, differs from that which is used when the communication data DT is transferred from the master unit 200 to the slave units $200_{-1} \sim 200_{-n}$. In the format for keys and display data as shown in FIG. 10, data ranging from physical status data PS to logical mode data LM are all identical, and omitted from illustration.

Talker address data TL indicates the address of a transmitting side (talker) which transmits the communication data DT.

Listener address data LN indicates the address of a receiving side (listener) which receives the communication data DT.

Logical status data LS represents the status of the function corresponding to each logical address LA.

The logical mode data LM represents the operation status (mode) of the function corresponding to each logical address LA.

The chuck sum data CS is data for detecting an added error to improve the reliability of the data D.

The classification data TP is postioned at the leading end of the communication data DT, and is a data area indicating the type of the data D following the classification data TP. The classification data TP is composed of major classification data $TP_L$ and subclassification data $TP_S$. As shown in FIG. 8, the major classification data $TP_L$ represents the type of the data D. If the entire classification data TP is of 8 bits, then the major classification data $TP_L$ is allotted four high-order bits. As shown in FIG. 9, the subclassification data $TP_S$ is mainly used to identify the format of the data D, and is allotted four low-order bits.

Since the classification data TP composed of the main classification and subclassification data $TP_L$, $TP_S$ is added, various command data are not mixed in one packet of communication data DT, and one packet of communication data DT may be short and simplified. The communication data DT can thus be systematized, and processed simply by transmitting and receiving units. Shortened packets of communication data are effective to reduce the time in which the communication bus is occupied by the communication data being transmitted, resulting in an increase in the data transfer efficiency. Since the major classification and subclassification data are positioned in the leading portion of the communication data, the type of the communication data can easily be identified by the receiving unit for easy debugging and failure analysis.

Figure 14:
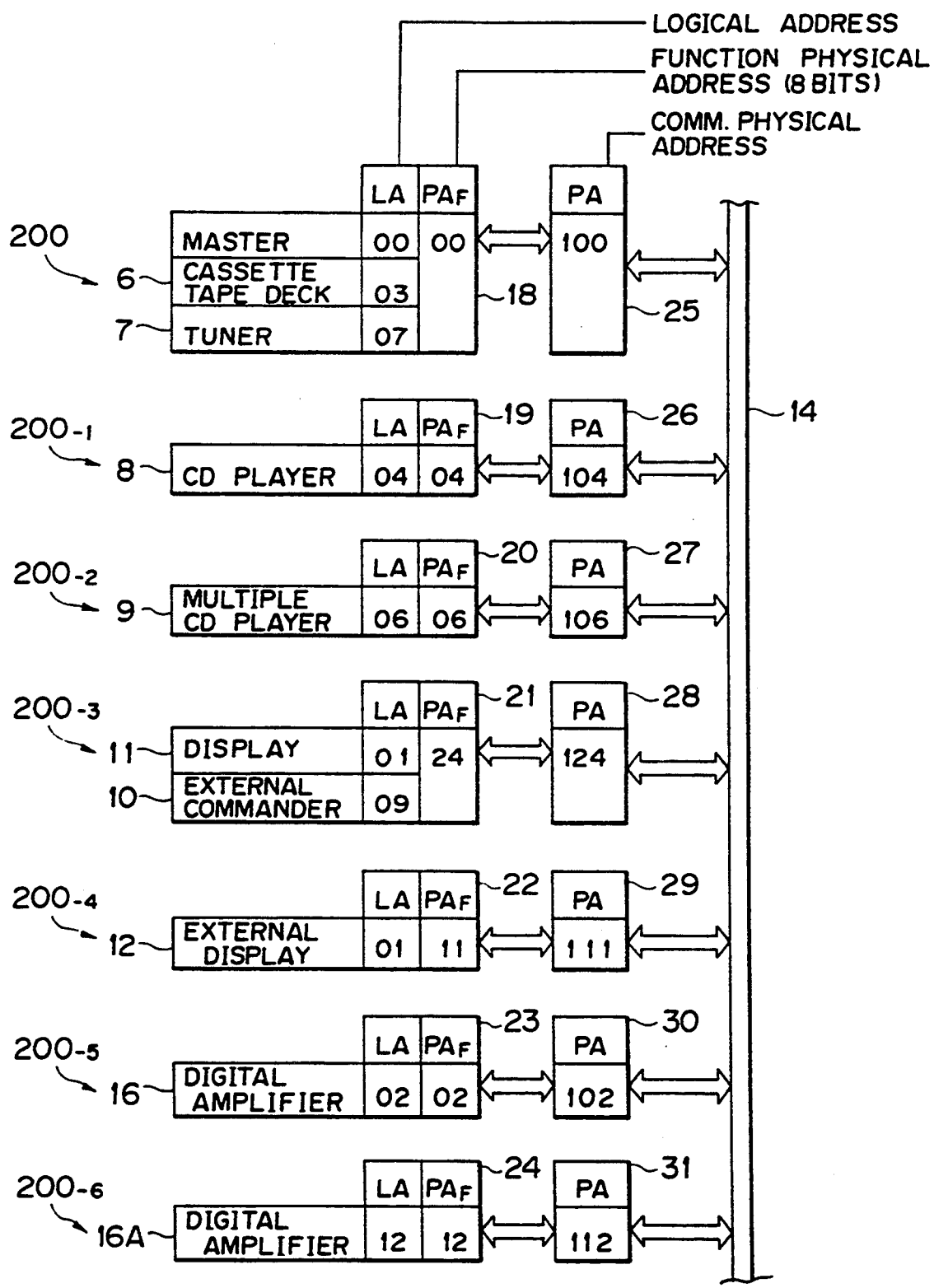
FIG. 14 is a diagram illustrative of an example in which physical and logical addresses are assigned.

As illustrated in FIGS. 11 and 12, the physical address data PA represents communication addresses for specifying the communication interface ICs 25~31 of the master unit 200 and the slave units $200_{-1} \sim 200_{-n}$ on the communication bus 14, the addresses indicating the master unit 200 and the slave units $200_{-1} \sim 200_{-n}$. The physical address data PA for specifying the master unit 200 is fixed at all times. Basically, one unit is allotted one physical address data PA. FIG. 14 shows an example in which the units shown in FIG. 4 are allotted physical address data. In FIG. 14, the physical address data PA are established for the master and slave controllers 18~24. This is because there is a case that two functional elements, such as the cassette tape deck 6 and the tuner 7, are connected to one master controller 18. If one controller has one function, then the physical address data PA and the logical address data LA indicate the same address.

The physical status data PS represents status information about the master unit 200 and the slave units $200_{-1} \sim 200_{-n}$, and includes data indicative of the number of function addresses (i.e., the logical address data LA, described below) that the units have.

As shown in FIG. 13, the logical address data LA is data indicative of each of the functions (i.e., the tuner and the cassette tape deck) possessed by the master unit 200 and the slave units $200_{-1} \sim 200_{-n}$.

The number of logical address data LA is not fixed because there are as many logical address data LA (e.g., $LA_1, LA_2, \ldots$) as there are functions possessed by the controller that is determined by the physical address data PA. FIG. 14 also shows the logical address data LA assigned to the units shown in FIG. 4.

In more detail, communication Its 25~31 have communication physical addresses PA. Each of the master and slave units 200, $200_{-1}, \ldots 200_{-6}$ has a function physical address PAF and the logical address LA. The master controller 18 includes two controllers for controlling the cassette tape deck 6 and the tuner 7, and, therefore, two logical addresses LA are assigned to those two controllers. Similarly, a controller of the slave unit $200_{-3}$ includes a display controller and an external commander controller and, therefore, a logical address is assigned to each controller. In case that each of the controllers of slave units as shown in the units $200_{-1}, 200_{-2}, 200_{-4}, 200_{-5}$ and $200_{-6}$ except address the slave unit $200_{-3}$, has only one function, the logical is equal to function physical address.

COMMUNICATING OPERATION

Transmission of the communication data DT between the master unit 200 and the slave units $200_{-1} \sim 200_{-n}$ of the audiovisual system will be described below.

Figure 15:
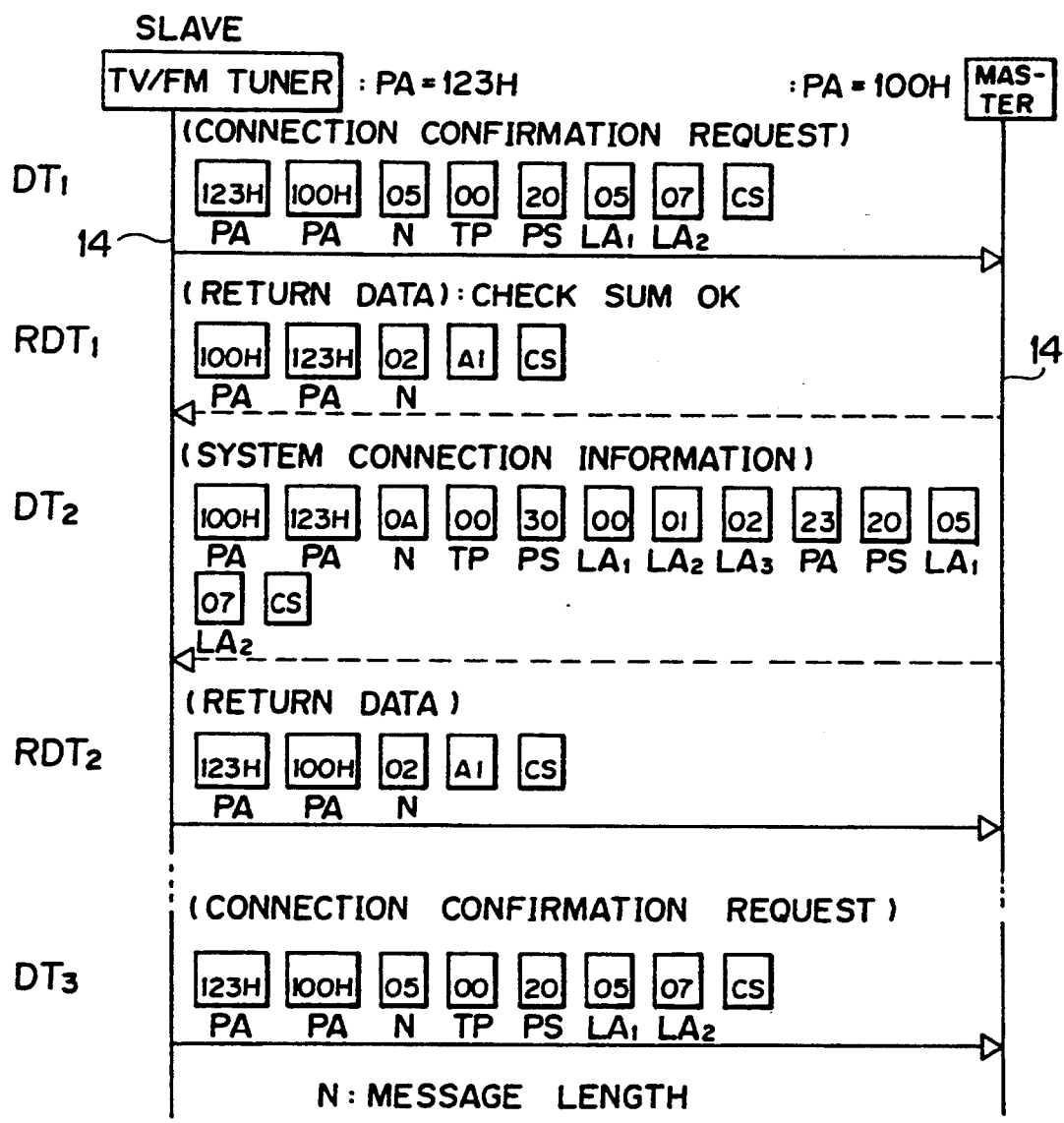
FIG. 15 is a diagram showing a communication process between the master and slave units.

FIG. 15 shows a specific communication process or sequence for confirming a connection when the master unit is accessed by a slave unit including TV and FM/AM tuners to confirm the connection of the slave unit to the audiovisual system.

In this network, the slave units send a self report about themselves to the master unit, unlike the conventional polling process. The master unit does not initially positively access the slave units.

First, the slave unit transmits communication data $DT_1$ for requesting the confirmation of a connection by way of a self report, to the master unit through the communication bus 14. At this time, the communication data $DT_1$ includes its own physical address data PA indicated by "123H" ("H" means the hexadecimal notation), physical address data PA of the master unit, indicated by "100H", logical address data $LA_1=05$ and logical address data $LA_2=07$, which indicate that the slave unit transmitting the communication data includes the TV and FM/AM tuners (see FIG. 13). When the communication data $DT_1$ is received, the master unit 200 registers, based on the physical address data PA=123H, the fact that the components with the functions indicated by $LA_1=05$, $LA_2=07$ are connected to the communication bus 14. These components will hereinafter be handled as audiovisual system members. In response to the received communication data $DT_1$, the master unit transmits return data $RDT_1$ back to the slave unit, indicating that the master unit has received the communication data $DT_1$. Then, in order to let the newly connected slave unit know the members or components of the audiovisual system, the master unit transmits system connection information $DT_2$ to the slave unit. When the system connection information $DT_2$ is received, the slave unit transmits return data $RDT_2$ back to the master unit to confirm the reception of the system connection information $DT_2$. After elapse of a predetermined period of time, the slave unit transmits communication data $DT_3$ concerning a request for confirming a connection (self report) again to the master unit. The communication data $DT_3$ is transmitted again because the connection must be confirmed periodically since the audiovisual system on the automobile is turned on and off depending on the ACC switch.

As described above, the communication data DT includes the physical address data PA and the logical address data LA, and the physical address data PA and the logical address data LA are independent of each other. Therefore, any desired combination of physical and logical address data PA, LA may be employed to transmit communication data to any desired unit.

While communication between slave and master units has been described above, it is also possible to transmit communication data between slave units.

As described above, the format of the communication data DT and the allotment of addresses to the units are different between the physical address data PA and the logical address data LA. As a consequence, even if physical address data PA is unknown, a new unit can be connected and can communicate with existing units provided logical address data LA are clearly established.

Figure 16:
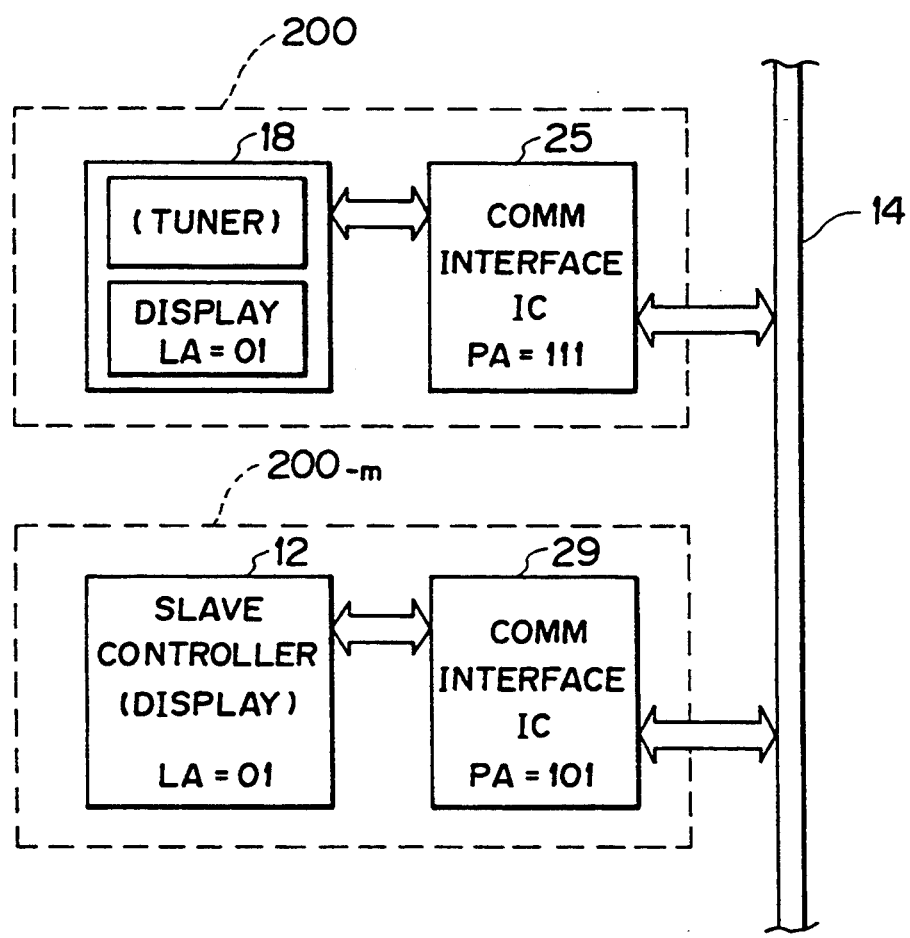
FIG. 16 is a diagram of the master unit and an additional slave unit which is newly connected.

More specifically, as shown in FIG. 16, it is assumed that a new slave unit $200_{-m}$ is connected to the communication bus 14. Even if the physical address data PA of the slave unit $200_{-m}$ is "101" which is not assumed, provided the function of the slave unit is a display function, the same function registered in the master unit 200 exists as logical address data LA=01, and hence the logical address data LA can be accessed. Therefore, it is possible to connect the slave unit $200_{-m}$ to the master unit 200. The capability of the audiovisual system to expand itself is thus increased.

Figure 17:
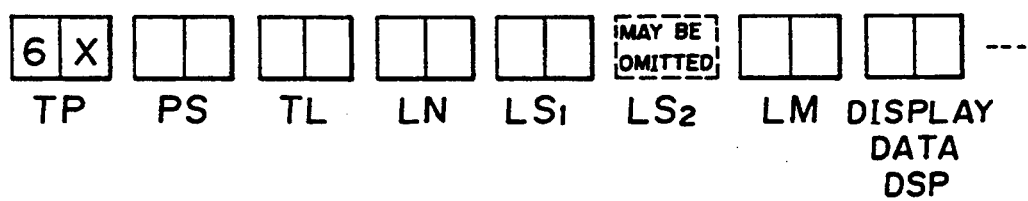
FIG. 17 is a diagram of a basic format for communication data having display data.

As shown in FIGS. 3 and 4, the audiovisual system includes the display units 11, 12 each for the centralized display of operation of the cassette tape deck 6, the tuner 7, and other slave units based on display data transmitted from these slave units. The display data from the units 200, $200_{-1} \sim 200_{-n-1}$ are transmitted to the slave unit $200_{-n}$. The communication data DT including the display data has a basic format as shown in FIG. 17. In FIG. 17, the display data DSP is positioned at the trailing end of the communication data DT. The communication data DT also includes a talker address (logical address) TL which is the address of a transmitting unit, a listener address (logical address) LN which is the address of a receiving unit, logical status data LS1, LS2 (for example, tuner fast feed (FF)), and logical mode data LN (FF ON or OFF).

Figure 18:
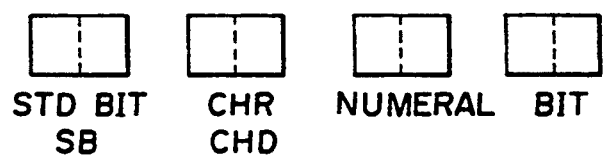
FIG. 18 is a diagram of a format for display data.
Figures 19, 20, 21A, 21B:
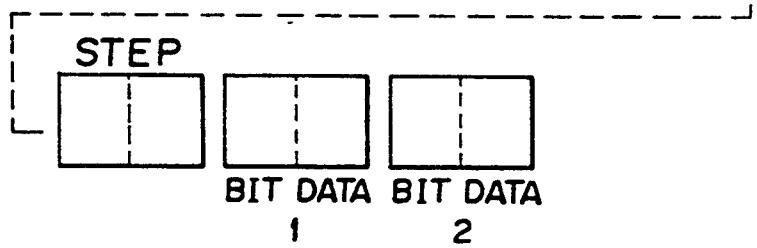
FIG. 19 is a diagram of a character data.
FIG. 20 is a diagram of a conventional display data format.
FIGS. 21A and 21B are diagrams of conventional bit data, respectively.

FIG. 18 shows a format for the display data DSP. The display data DSP includes standard (common) bit data SB positioned at the leading end thereof, the standard bit data SB being common with the sources or salve units $200_{-1} \sim 200_{-n}$, and character data CHD following the standard bit data SB. The character data CHD are data regaring characters, symbols, or the like to be displayed, and may be in the form of an "ASCII code", for example. Further, the DSP data includes numeral data, that is, data on numerals in display data DSP and bit data for indicating operating contents or etc. as shown in FIGS. 21A and 21B, that is, bit display data to be displayed. An example of character data CHD representing four characters is shown in FIG. 19.

While the standard bit data SB and the character data CHD are used in combination in FIG. 18, only standard bit data SB may be positioned at the leading end of the display data DSP or only the character data CHD may be positioned at the leading end of the display data DSP.

Although certain preferred embodiments of the present invention have been shown and described in detail, it should be understood that various changes and modifications may be made therein without departing from the scope of the appended claims.

What is claimed is:

1. A system for data communication in a communication network, comprising:

a communication bus;

a master unit connected to said communication bus; and a plurality of slave units connected to said communication bus, one of said slave units being a display unit, each of said slave units other than said display unit transmitting display data, which include character data regarding characters to be displayed, onto said communication bus, said characters indicating an operation of each of said slave units other than said display unit, respectively, said display unit receiving the transmitted display data from said communication bus directly from said other slave units and not via said master unit, and comprising means for displaying the operation of each of said slave units other than said display unit based on the received display data.

2. A system according to claim 1, wherein said character data is positioned at a leading end of said display data.

3. A system for data communication in a communication network, comprising:

a communication bus;

a master unit connected to said communication bus; and a plurality of slave units connected to said communication bus, one of said slave units being a display unit, each of said slave units other than said display unit transmitting display data, which include character data regarding characters to be displayed and standard bit data which is common with said slave units, directly and not via said master unit onto said communication bus, said characters indicating an operation of each of said slave units other than said display unit, respectively, said display unit receiving the transmitted display data from said communication bus, and comprising means for displaying the operation of each of said slave units other than said display unit based on the received display data.

4. A system according to claim 3, wherein said character data and said standard bit data are positioned at a leading end of said display data.

* * * * *